(12) United States Patent
Uhm et al.

(10) Patent No.: US 12,299,814 B2
(45) Date of Patent: May 13, 2025

(54) ELECTRONIC DEVICE FOR PROVIDING CONTENTS IN CONNECTION WITH EXTERNAL ELECTRONIC DEVICE AND METHOD OF THE SAME

(71) Applicant: SAMSUNG ELECTRONICS CO., LTD., Suwon-si (KR)

(72) Inventors: Junwhon Uhm, Suwon-si (KR); Seungnyun Kim, Suwon-si (KR); Hyunsoo Kim, Suwon-si (KR); Bokun Choi, Suwon-si (KR); Hochul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 18/086,426

(22) Filed: Dec. 21, 2022

(65) Prior Publication Data

US 2023/0169723 A1    Jun. 1, 2023

Related U.S. Application Data

(63) Continuation of application No. PCT/KR2022/018602, filed on Nov. 23, 2022.

(30) Foreign Application Priority Data

Nov. 29, 2021  (KR) .......................... 10-2021-0167568
Mar. 18, 2022  (KR) .......................... 10-2022-0034188

(51) Int. Cl.
*G06T 17/00* (2006.01)
*G06T 7/50* (2017.01)
(Continued)

(52) U.S. Cl.
CPC ................ *G06T 17/00* (2013.01); *G06T 7/50* (2017.01); *G06T 7/62* (2017.01); *G06T 7/70* (2017.01);
(Continued)

(58) Field of Classification Search
None
See application file for complete search history.

(56) References Cited

U.S. PATENT DOCUMENTS 8,427,396 B1 *  4/2013  Kim ..................... G02B 27/017
                                                       345/8
10,818,093 B2   10/2020  Chen et al.
(Continued)

FOREIGN PATENT DOCUMENTS

JP      2021-125834 A    8/2021
KR   10-2016-0009212 A   1/2016
(Continued)

OTHER PUBLICATIONS

Communications dated Mar. 6, 2023, issued by the International Searching Authority in counterpart International Application No. PCT/KR2022/018602 (PCT/ISA/210 and PCT/ISA/237).
(Continued)

*Primary Examiner* — Michael J Cobb
(74) *Attorney, Agent, or Firm* — Sughrue Mion, PLLC

(57) ABSTRACT

An electronic device includes a camera, a communication circuit, and at least one processor configured to receive, via the communication circuit, information related to content reproduced by an external display device, obtain, by the camera, a first image including the external display device, based on the external display device being identified to be outside of an identifiable range of the camera, generate a virtual object corresponding to the external display device, obtain the content reproduced by the external display device, based on the information related to the content reproduced by the external display device, and reproduce the obtained content within an area of the virtual object.

16 Claims, 15 Drawing Sheets

(51) Int. Cl.
*G06T 7/62* (2017.01)
*G06T 7/70* (2017.01)
*G06V 10/74* (2022.01)
*H04N 21/431* (2011.01)

(52) U.S. Cl.
CPC ....... *G06V 10/761* (2022.01); *H04N 21/4312* (2013.01)

(56) References Cited

U.S. PATENT DOCUMENTS

| | | |
|---|---|---|
| 11,194,881 B2 | 12/2021 | Lee et al. |
| 2014/0015736 A1 | 1/2014 | Kim |
| 2015/0061973 A1 | 3/2015 | Park et al. |
| 2016/0189426 A1 | 6/2016 | Thomas et al. |
| 2018/0246565 A1* | 8/2018 | Moon ................. G06F 3/016 |
| 2019/0362560 A1 | 11/2019 | Choi et al. |
| 2020/0184694 A1 | 6/2020 | Joo |
| 2020/0410769 A1* | 12/2020 | Lee ................. G02B 27/0093 |
| 2022/0076465 A1 | 3/2022 | Kang et al. |
| 2022/0407666 A1* | 12/2022 | Lim ................. H04W 76/15 |
| 2023/0043422 A1 | 2/2023 | Kawakami et al. |
| 2024/0134193 A1* | 4/2024 | Chen ................. G02B 27/0172 |

FOREIGN PATENT DOCUMENTS

| | | |
|---|---|---|
| KR | 10-2017-0100641 A | 9/2017 |
| KR | 10-1861380 B1 | 5/2018 |
| KR | 10-2019-0101827 A | 9/2019 |
| KR | 10-2081934 B1 | 2/2020 |
| KR | 10-2099834 B1 | 4/2020 |
| KR | 10-2020-0072727 A | 6/2020 |
| KR | 10-2020-0085045 A | 7/2020 |
| KR | 10-2021-0055381 A | 5/2021 |
| KR | 10-2265086 B1 | 6/2021 |
| KR | 10-2021-0083822 A | 7/2021 |

OTHER PUBLICATIONS

Communication issued on Nov. 26, 2024 from the European Patent Office for European Patent Application No. 22899021.4.

* cited by examiner

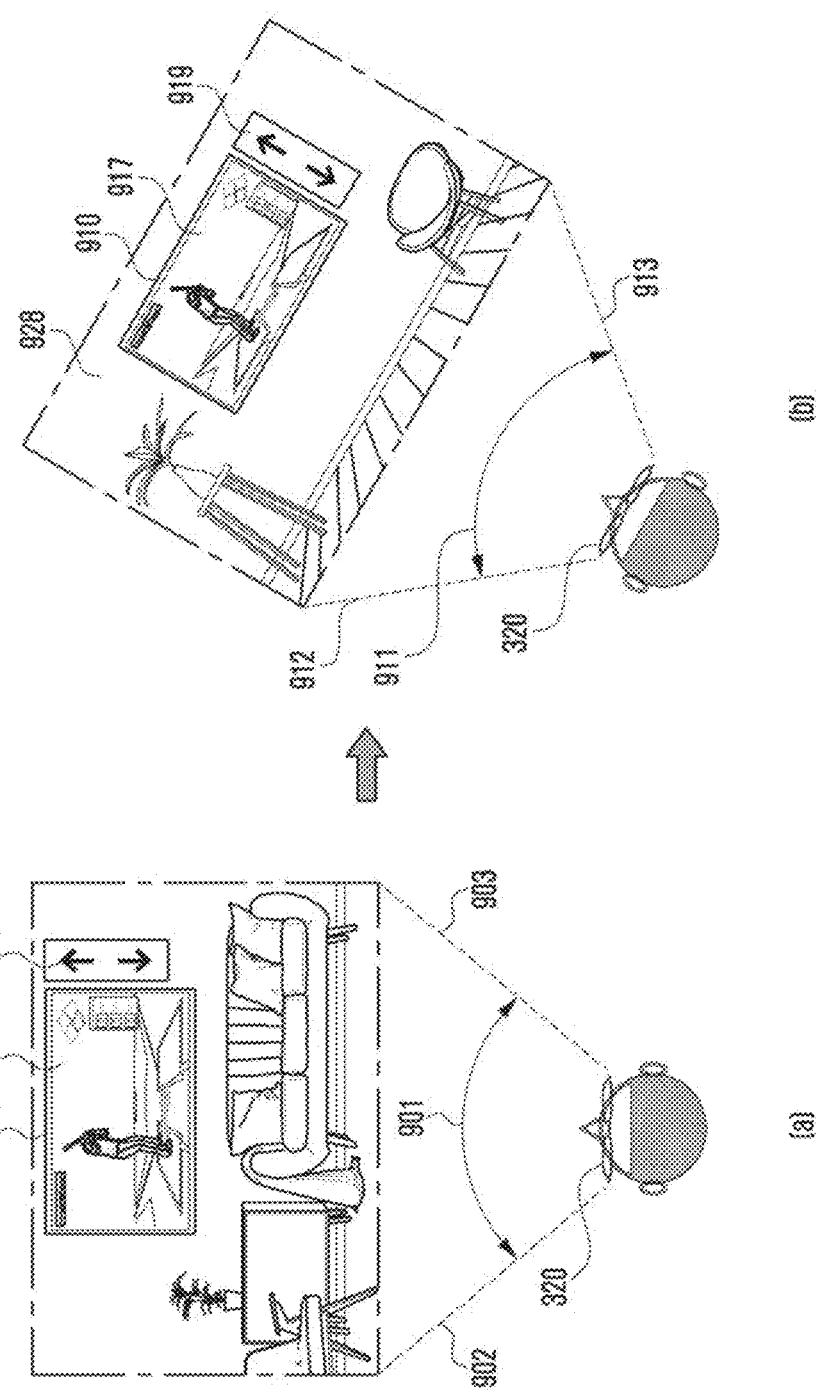

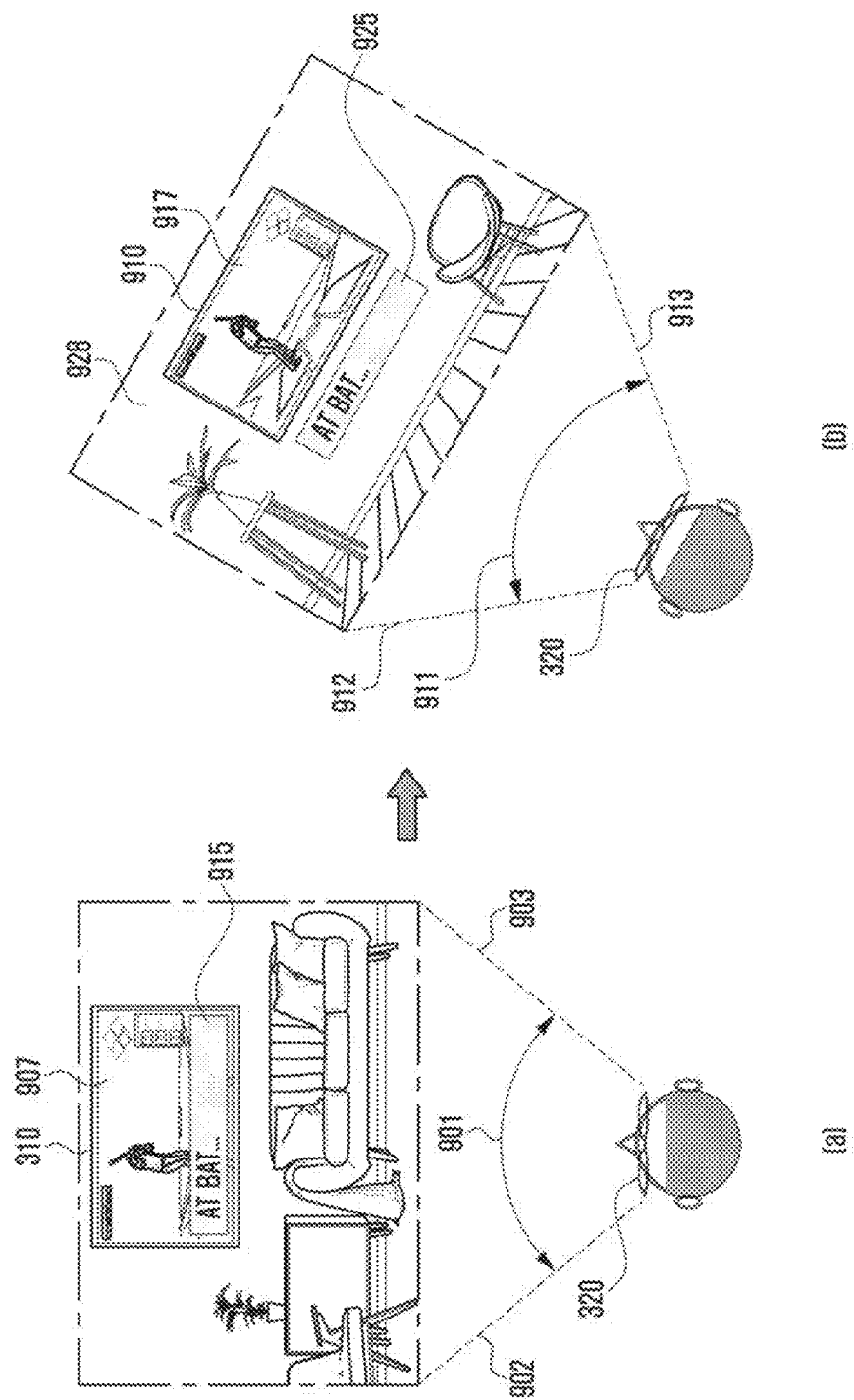

ELECTRONIC DEVICE FOR PROVIDING CONTENTS IN CONNECTION WITH EXTERNAL ELECTRONIC DEVICE AND METHOD OF THE SAME

CROSS-REFERENCE TO RELATED APPLICATION(S)

This application is a bypass continuation of International Application No. PCT/KR2022/018602, filed on Nov. 23, 2022, in the Korean Intellectual Property Receiving Office, which is based on and claims priority to Korean Patent Application No. 10-2022-0034188, filed on Mar. 18, 2022, and Korean Patent Application No. 10-2021-0167568, filed on Nov. 29, 2021, in the Korean Intellectual Property Office, the disclosures of which are incorporated herein by reference in their entireties.

BACKGROUND

1. Field

The disclosure relates to an electronic device and a method for providing content in the electronic device that provides an augmented reality service by interworking with an external display device.

2. Description of Related Art

Augmented reality (AR) is a technology that combines a real space and a virtual space such that a virtual object appears to exist in a real space, and AR may originate from virtual reality that creates a virtual space similar to reality using computer graphics.

Recently, as an electronic device for providing an AR service (hereinafter referred to as an AR device), wearable electronic devices capable of being directly worn on the body have been developed. For example, the wearable electronic devices providing augmented reality may include a head-mounted device (HMD), a head-mounted display (HMD), or AR glasses.

The AR devices described above may enable a user wearing the same to view content provided through an external display device located in the surrounding environment.

If an external display device disappears from the view as the user's gaze moves while viewing content provided to the external display device through an AR device, the user can no longer use the content that the user was viewing.

In addition, if an external display device comes into the view while viewing content through an AR device, the user may wish to view the content through the external display device.

The technical problems to be solved in the disclosure are not limited to the technical problems mentioned above, and other technical problems that are not mentioned may be clearly understood by those of ordinary skill in the art to which the disclosure belongs from the description below.

SUMMARY

According to an aspect of the disclosure, an electronic device may include a camera, a communication circuit; and at least one processor configured to receive, via the communication circuit, information related to content reproduced by an external display device, obtain, by the camera, a first image including the external display device, based on the external display device being identified to be outside of an identifiable range of the camera, generate a virtual object corresponding to the external display device, obtain the content reproduced by the external display device, based on the information related to the content reproduced by the external display device, and reproduce the obtained content within an area of the virtual object.

The at least one processor may be further configured to provide a second image including the external display device after the external display device is identified as being outside of the identifiable range.

The at least one processor may be further configured to stop providing the second image based on the content starting to be reproduced through the virtual object.

The at least one processor may be further configured to obtain information about the external display device from the first image, and virtual object corresponding to the external display device may be generated based on the information about the external display device.

The information about the external display device may include at least one of size information, position information, and depth information of the external display device, and the virtual object may be reproduced based on the information about the external display device.

The at least one processor may be further configured to receive the content from the external display device, based on the information related to the content.

The information related to the content may include information on an external server providing the content or address information of the content, and the at least one processor may be further configured to connect to the external server based on the information related to the content, and receive the content.

The information related to the content may include at least one of application information for reproducing the content, audio volume level information of the content, and reproduction time information of the content, and the at least one processor may be further configured to reproduce the content within the area of the virtual object based on the information related to the content.

The at least one processor may be further configured to display another virtual object for controlling the content reproduced in the area of the virtual object based on the information about the external display device and after the external display device is identified to be outside of the identifiable range of the camera.

The at least one processor may be further configured to, based on the content starting to be reproduced through the virtual object, perform at least one of muting the external display device and switching the external display device to an inactive state.

According to an aspect of the disclosure, a method of an electronic device may include receiving information related to content reproduced by an external display device, obtaining a first image including the external display device, based on the external display device being identified to be outside of an identifiable range of a camera of the electronic device, generating a virtual object corresponding to the external display device, obtaining the content reproduced by the external display device based on the information related to the content reproduced by the external display device, and reproducing the obtained content within an area of the virtual object.

The method may further include providing a second image including the external display device after the external display device is identified as being outside the identifiable range.

The method may further include stopping providing the second image based on the content starting to be reproduced through the virtual object.

The method may further include obtaining information about the external display device from the first image, and the virtual object corresponding to the external display device may be generated based on the information about the external display device.

The information about the external display device may include at least one of size information, position information, or depth information of the external display device, and the virtual object may be reproduced based on the information about the external display device.

The method may further include receiving the content from the external display device based on the information related to the content.

The information related to the content may include information on an external server providing the content or address information of the content, and the method may further include connecting to the external server based on the information related to the content, and receiving the content.

The information related to the content may include at least one of application information for reproducing the content, audio volume level information of the content, and reproduction time information of the content, and the content may be reproduced within the area of the virtual object based on the information related to the content.

The method may further include displaying another virtual object for controlling the content reproduced in the area of the virtual object based on the information about the external display device and after the external display device is identified to be outside of the identifiable range of the camera.

The method may further include performing at least one of an operation of muting the external display device and an operation of switching the external display device to an inactive state based the content starting to be reproduced through the virtual object.

According to various embodiments, in the case where a display device disappears from the view of a user as the user's gaze moves while wearing an AR device and viewing content provided by an external display device, it is possible to provide the content that the user was viewing on the display device as an AR service through the AR device.

In addition, when an external display device comes into the view while viewing content according to an AR service provided by the AR device, it is possible to provide the corresponding content by the external display device.

Various embodiments may seamlessly and conveniently provide an optimized mixed reality experience in association with an external display device without overlapping between real objects and virtual objects in providing content according to an AR service through an AR device.

In addition, various effects directly or indirectly identified may be provided.

BRIEF DESCRIPTION OF DRAWINGS

The above and other aspects, features, and advantages of certain embodiments of the present disclosure will be more apparent from the following description taken in conjunction with the accompanying drawings, in which.

FIGS. 9A, 9B, and 9C are diagrams illustrating the operation of an AR device according to an embodiment.

DETAILED DESCRIPTION

Figure 1:
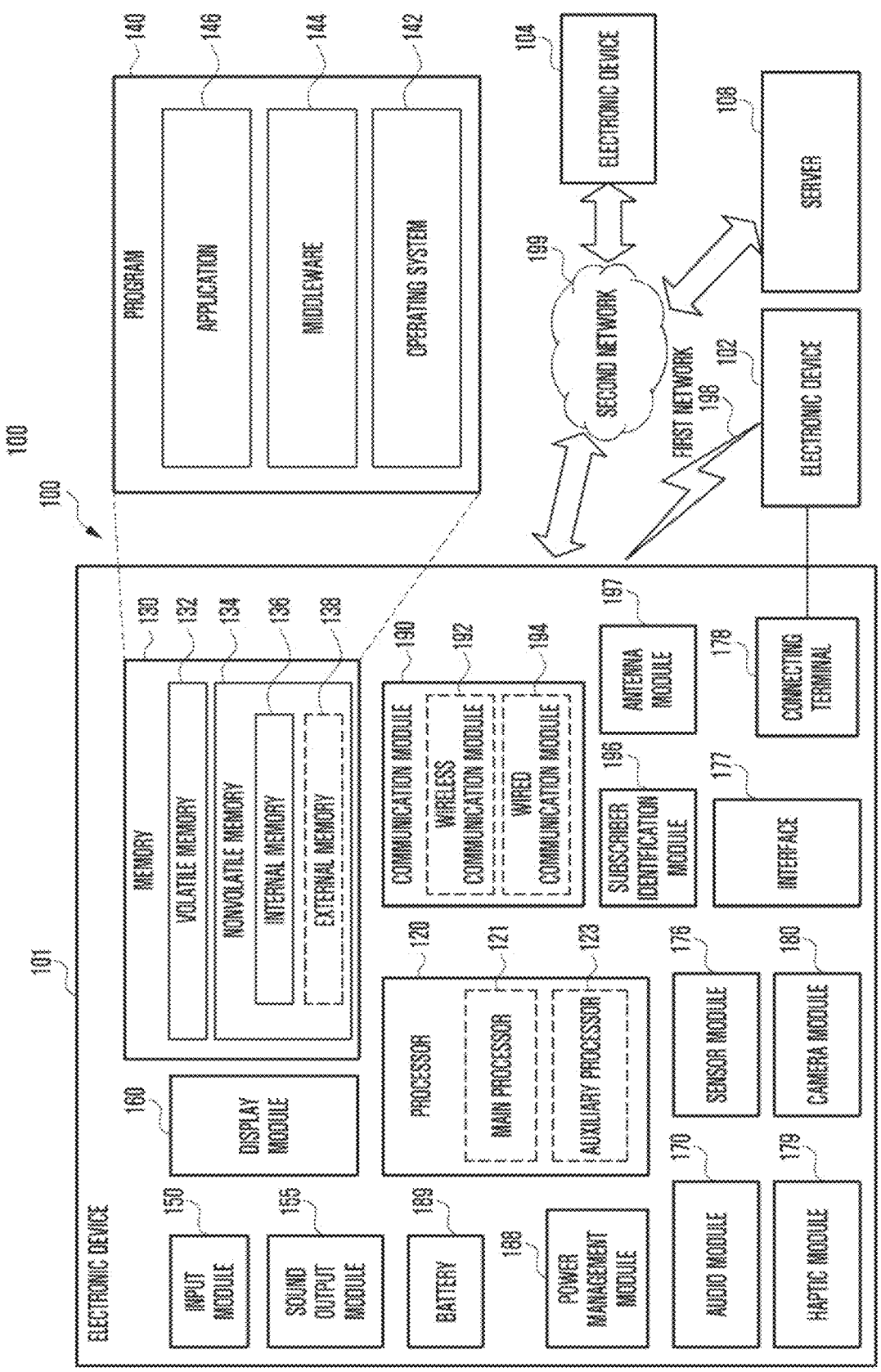
FIG. 1 is a diagram of a terminal device according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1 module 150, a sound output 1 module 155, a display 1 module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1 module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related therereto. The memory 130 may include the volatile memory 132 or the non-volatile memory 134.

The program 140 may be stored in the memory 130 as software, and may include, for example, an operating system (OS) 142, middleware 144, or an application 146.

The input 1 module 150 may receive a command or data to be used by another component (e.g., the processor 120) of the electronic device 101, from the outside (e.g., a user) of the electronic device 101. The input 1 module 150 may include, for example, a microphone, a mouse, a keyboard, a key (e.g., a button), or a digital pen (e.g., a stylus pen).

The sound output 1 module 155 may output sound signals to the outside of the electronic device 101. The sound output 1 module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1 module 160 may visually provide information to the outside (e.g., a user) of the electronic device 101. The display 1 module 160 may include, for example, a display, a hologram device, or a projector and control circuitry to control a corresponding one of the display, hologram device, and projector. According to an embodiment, the display 1 module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1 module 150, or output the sound via the sound output 1 module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
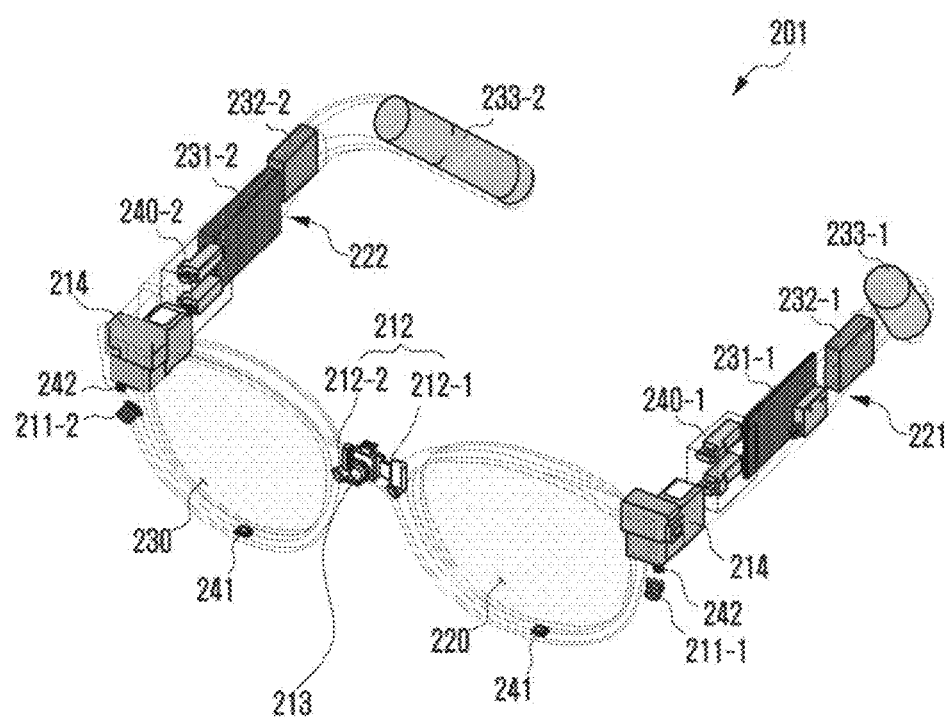
FIG. 2A is a diagram of an augmented reality (AR) device according to an embodiment.
Figure 2B:
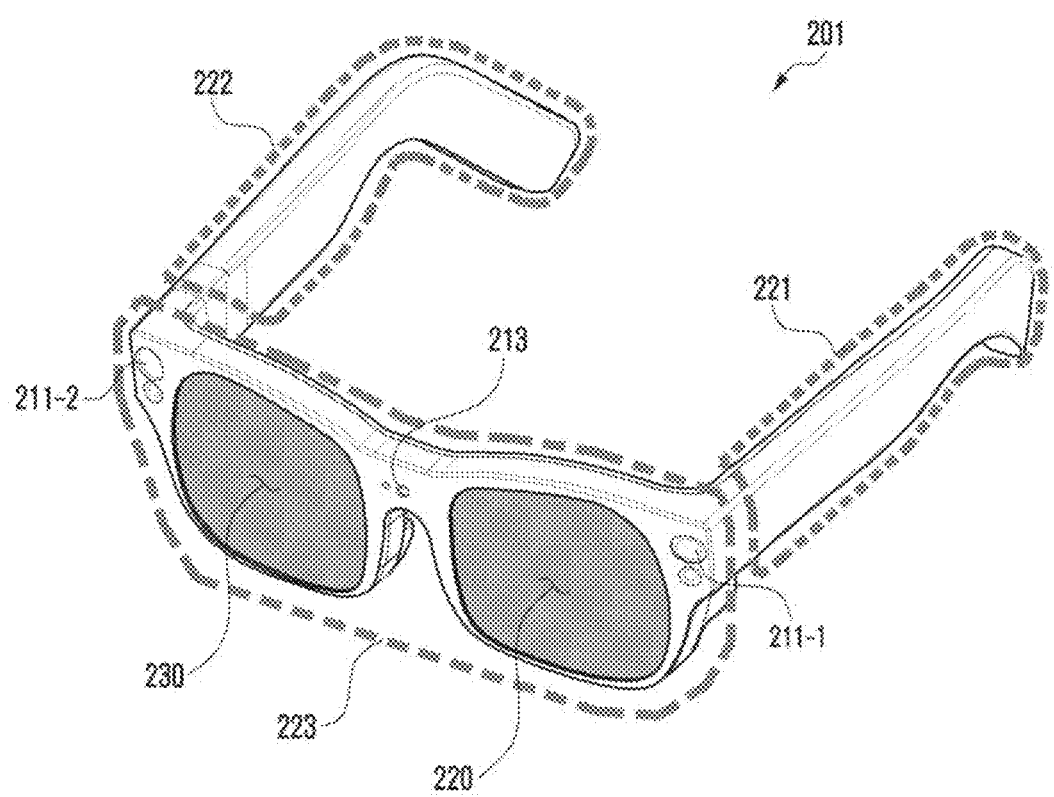
FIG. 2B is a diagram illustrating a front side of an AR device according to an embodiment.
Figure 2C:
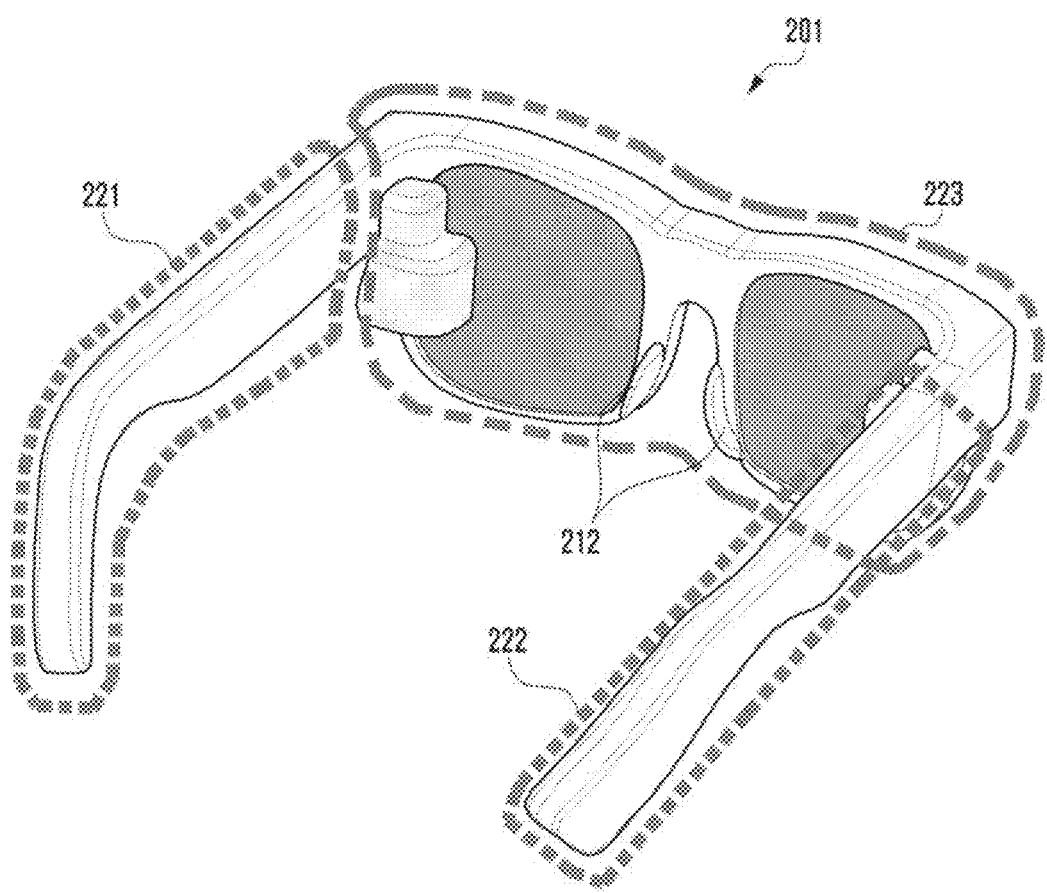
FIG. 2C is a diagram illustrating a rear side of an AR device according to an embodiment.

FIG. 2A is a diagram of an augmented reality (AR) device according to an embodiment. FIG. 2B is a diagram illustrating a front side of an AR device according to an embodiment. FIG. 2C is a diagram illustrating a rear side of an AR device according to an embodiment. FIG. 2B is a first exemplary view showing the front part of the AR device 201, FIG. 2C is a second exemplary view showing the rear part of the AR device 201, and the internal configuration may be as shown in FIG. 2A.

In various embodiments, the AR device 201 may be worn on a user's head to provide the user with an image related to an AR service. According to an embodiment, the AR device 201 may provide the AR service in which at least one virtual object is output to be superimposed on an area determined as a user's field of view (FoV). For example, the area determined as the user's FoV is an area determined to be recognizable through the AR device 201 by the user wearing the AR device 201, and it may be an area including the overall or at least a part of a display module (e.g., a display module 428 in FIG. 4) of the AR device 201. According to an embodiment, the AR device 201 may include a plurality of glasses (e.g., a first glass 220 and/or a second glass 230) corresponding to both eyes of the user (e.g., left eye and/or right eye). The plurality of glasses may include at least a part of a display module (e.g., a first display module 428-1 and/or a second display module 428-2 in FIG. 4). For example, the first glass 220 corresponding to the user's left eye may include the first display module 428-1, and the second glass 230 corresponding to the user's right eye may include the second display module 428-2. The AR device 201 may be configured, for example, in the form of at least one of glasses, goggles, a helmet, or a hat, but is not limited thereto.

With reference to FIG. 2A, the AR device 201 according to an embodiment may include a display module 214, a camera module, an audio module, a first support part 221, and/or a second support part 222. According to an embodiment, the display module may include a first display (e.g., the first glass 220) (e.g., the first display module 428-1 in FIG. 4) and/or a second display (e.g., the second glass 230) (e.g., the second display module 428-2 in FIG. 4). According to an embodiment, at least one camera may include a shooting camera 213 for capturing an image corresponding to the user's FoV and/or measuring a distance to an object, an eye tracking camera 212 for identifying the direction of a user's gaze, and/or gesture cameras 211-1 and 211-2 for recognizing a certain space. For example, the shooting camera 213 may photograph in a front direction of the AR device 201, and the eye tracking camera 212 may photograph in a direction opposite to the photographing direction of the shooting camera 213. For example, the eye tracking camera 212 may photograph at least in part both eyes of the user. According to an embodiment, the first support part 221 and/or the second support part 222 may include a PCB 231-1, 231-2, a speaker 232-1, 232-2, and/or a battery 233-1, 233-2.

According to an embodiment, the display module (e.g., the display module 214 in FIG. 2A) may be disposed in a body part (e.g., a body part 223 in FIG. 2B) of the AR device 201, and may include a condensing lens and/or a transparent waveguide on the glass (e.g., the first glass 220 and the second glass 230). For example, the transparent waveguide may be positioned at least in part on a portion of the glass. According to an embodiment, the light emitted from the display module may be incident on one end of the glass through the first glass 220 and the second glass 230, and the incident light may be transferred to the user through the waveguide formed on the glass. The waveguide may be made of glass, plastic, or polymer, and may include a nano-pattern, e.g., a polygonal or curved grating structure, formed on one inner or outer surface thereof. According to an embodiment, the incident light may be propagated or reflected inside the waveguide by the nano-pattern and provided to the user. According to an embodiment, the waveguide may include at least one diffractive element (e.g., a diffractive optical element (DOE) or a holographic optical element (HOE)) and/or a reflective element (e.g., a reflective mirror). According to an embodiment, using the at least one diffractive element or the reflective element, the waveguide may guide the display light emitted from the light source to the user's eyes.

With reference to FIG. 2A, the first support part 221 and/or the second support part 222 may include the printed circuit board 231-1, 231-2 for transmitting an electrical signal to respective components of the AR device 201, the speaker 232-1, 232-2 for outputting an audio signal, the battery 233-1, 233-2, and/or a hinge part 240-1, 240-2 coupled at least in part to the body part 223 of the AR device 201. According to an embodiment, the speaker 232-1, 232-2 may include a first speaker 232-1 for transferring an audio signal to the user's left ear and a second speaker 232-2 for transferring an audio signal to the user's right ear. According to an embodiment, the AR device 201 may include a plurality of batteries 233-1 and 233-2, which may supply power to the printed circuit boards 231-1 and 231-2 through a power management module.

Referring to FIG. 2A, the AR device 201 may include a microphone 241 for receiving a user's voice and ambient sounds. The AR device 201 may include at least one light emitting device (illumination light emitting diode (LED)) 242 for increasing the accuracy of the at least one camera (e.g., the shooting camera 213, the eye tracking camera 212, and/or the gesture cameras 211-1 and 211-2). For example, the light emitting device 242 may be used as an auxiliary means to increase accuracy when the eye tracking camera 212 photographs the user's pupil, and the light emitting device 242 may use an IR LED having an infrared wavelength rather than a visible light wavelength. In another example, when the gesture cameras 211-1 and 211-2 take a user's gesture, the light emitting device 242 may be used as an auxiliary means if it is not easy to detect a subject to be photographed due to a dark environment or mixing of various light sources and reflected light.

With reference to FIGS. 2B and 2C, the AR device 201 according to an embodiment may include the body part 223 and the support part (e.g., the first support part 221 and/or the second support part 222), and the body part 223 and the support parts 221 and 222 may be operatively connected. For example, the body part 223 and the support parts 221 and 222 may be operatively connected through the hinge parts 240-1 and 240-2. The body part 223 may be mounted at least in part on the user's nose, and may include the display module and the camera module. The support parts 221 and 222 may include a support member mounted on the user's ear, and may include the first support part 221 mounted on the left ear and/or the second support part 222 mounted on the right ear. According to an embodiment, the first support part 221 or the second support part 222 may include at least in part the printed circuit board 231-1, 231-2, the speaker 232-1, 232-2, and/or the battery 233-1, 233-2. The battery may be electrically connected to the power management module.

According to an embodiment, the display module may include the first glass 220 and/or the second glass 230, and may provide visual information to the user through the first glass 220 and the second glass 230. The AR device 201 may include the first glass 220 corresponding to the left eye and/or the second glass 230 corresponding to the right eye. According to an embodiment, the display module may include a display panel and/or a lens (e.g., glass). For example, the display panel may include a transparent material such as glass or plastic.

According to an embodiment, the display module may be formed of a transparent element, so the user may recognize a real space behind the display module through the display module. The display module may display a virtual object on at least a portion of the transparent element so that the virtual object can be seen to the user as if added to at least a portion of the real space. The first glass 220 and/or the second glass 230 included in the display module may include a plurality of display panels corresponding to both eyes of the user (e.g., the left eye and/or the right eye).

According to an embodiment, the AR device 201 may include a virtual reality (VR) device. When the AR device 201 is the VR device, the first glass 220 may be the first display module 428-1, and the second glass 230 may be the second display module 428-2.

According to an embodiment, the virtual object output through the display module may include information related to an application program executed in the AR device 201 and/or information related to an external object located in the real space corresponding to an area determined as a user's FoV. For example, from image information related to the real space acquired through the camera (e.g., the shooting camera 213) of the AR device 201, the AR device 201 may identify an external object included in at least a portion corresponding to the area determined as the user's FoV. The AR device 201 may output (or display) a virtual object related to the identified external object through the area determined as the user's FoV in the display area of the AR device 201. The external object may include a thing existing in the real space. According to various embodiments, the display area in which the AR device 201 displays the virtual object may include a portion (e.g., at least a portion of the display panel) of the display module (e.g., the first display module 428-1 or the second display module 428-2). According to an embodiment, the display area may correspond to at least a portion of the first glass 220 and/or the second glass 230.

According to an embodiment, the AR device 201 may include the shooting camera 213 (e.g., an RGB camera) for capturing an image corresponding to the user's FoV and/or measuring a distance to an object, the eye tracking camera 212 for identifying the direction of a user's gaze, and/or the recognizing cameras 211-1 and 211-2 (e.g., gesture camera) for recognizing a certain space. According to an embodiment, using the shooting camera 213, the AR device 201 may measure a distance to an object located in the front direction of the AR device 201. According to an embodiment, in the AR device 201, a plurality of eye tracking cameras 212 may be disposed to correspond to both eyes of the user. For example, the eye tracking camera 212 may photograph in a direction opposite to the photographing direction of the shooting camera 213. The eye tracking camera 212 may detect the user's gaze direction (e.g., eye movement). For example, the eye tracking camera 212 may include a first eye tracking camera 212-1 for tracking the gaze direction of the user's left eye, and a second eye tracking camera 212-2 for tracking the gaze direction of the user's right eye. According to an embodiment, using the recognizing cameras 211-1 and 211-2, the AR device 201 may detect a user gesture within a predetermined distance (e.g., a certain space). For example, there may be a plurality of recognizing cameras 211-1 and 211-2, which may be disposed on both sides of the AR device 201. Using at least one camera, the AR device 201 may detect an eye corresponding to a primary eye and/or an auxiliary eye from among the left eye and/or the right eye. For example, the AR device 201 may detect an eye corresponding to the primary eye or the auxiliary eye or both, based on the user's gaze direction with respect to the external object or the virtual object.

According to an embodiment, the shooting camera 213 may include a high resolution (HR) camera and/or a photo video (PV) camera. According to an embodiment, the eye tracking camera 212 may detect the user's pupil, thereby track the gaze direction, and may be utilized to move the center of a virtual image along the gaze direction. For example, the eye tracking camera 212 may be divided into the first eye tracking camera 212-1 corresponding to the left eye and the second eye tracking camera 212-2 corresponding to the right eye, which may have substantially the same performance and/or specifications. According to an embodiment, the recognizing cameras 211-1 and 211-2 may be used for detection of a user's hand (gesture) or spatial recognition or both, and may include a global shutter (GS) camera. For example, in order to detect and track quick hand movements and/or minute finger movements, the recognizing cameras 211-1 and 211-2 may include the GS camera with less screen afterimage such as a rolling shutter (RS) camera.

According to an embodiment, the AR device 201 may display together a virtual object related to the AR service, based on image information related to a real space acquired through a camera (e.g., the camera module 422 in FIG. 4) of the AR device 201. According to an embodiment, the AR device 201 may display the virtual object, based on a display module (e.g., the first display module 428-1 corresponding to the left eye and/or the second display module 428-2 corresponding to the right eye) disposed to correspond to both eyes of the user. According to an embodiment, the AR device 201 may display the virtual object, based on predetermined setting information (e.g., resolution, frame rate, brightness, and/or display area).

According to an embodiment, the AR device 201 may enable the first display panel included in the first glass 220 and the second display panel included in the second glass 230 to be operated as independent components, respectively. For example, the AR device 201 may determine the display performance of the first display panel, based on first setting information, and may determine the display performance of the second display panel, based on second setting information.

The number and location(s) of one or more cameras (e.g., the shooting camera 213, the eye tracking camera 212, or the recognizing camera 211-1, 211-2) included in the AR device 201 shown in FIG. 2A, FIG. 2B, and/or FIG. 2C may not be limited. For example, based on the form (e.g., shape or size) of the AR device 201, the number and location(s) of one or more cameras (e.g., the shooting camera 213, the eye tracking camera 212, and/or the recognizing camera 211-1, 211-2) may vary.

Figure 3:
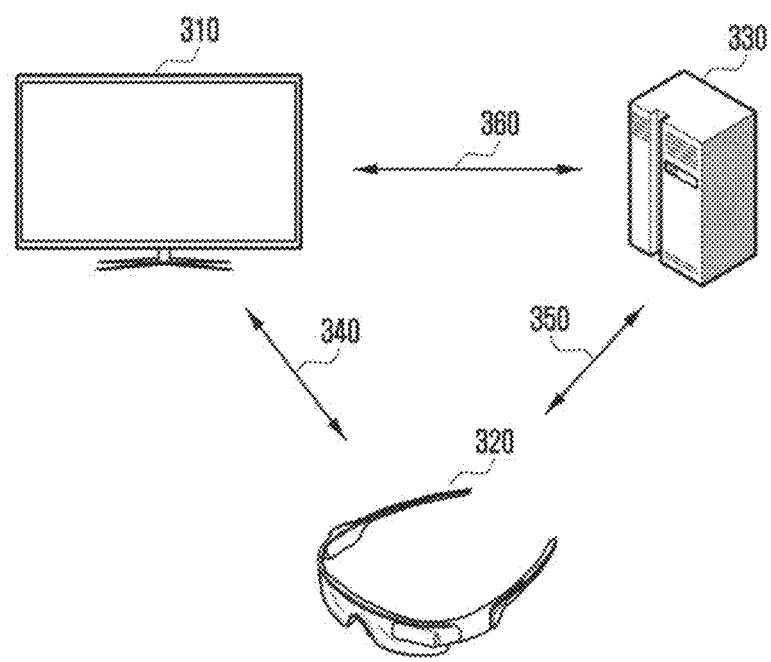
FIG. 3 is a diagram illustrating a connection relationship of a display device, an AR device and a server according to an embodiment.

FIG. 3 is a diagram illustrating a connection relationship of a display device 310, an AR device 320 (e.g., the AR device 201 in FIGS. 2A to 2C), and a server 330 according to an embodiment.

Referring to FIG. 3, in order to provide content, the AR device 320 may be connected to the display device 310 using a wireless network 340. The AR device 320 may be in the form of glasses capable of being worn on the user as shown in FIGS. 2A to 2C.

The display device 310 may be an electronic device that performs wireless communication and includes a display for outputting a variety of content including image data. For example, the display device 310 may include various electronic devices having a display, such as a television (TV) set, a mobile terminal, a mobile phone, and a monitor. The AR device 320 may receive information related to the content, which is being currently reproduced, from the display device 310 using the wireless network 340. The content being reproduced in the display device 310 may include a variety of content such as moving images, still images, documents, and homepages, but is not limited thereto. The content-related information may include, for example, related application information, content reproduction information, information on the name, capacity, and version of corresponding content, and information for obtaining corresponding content. The information for obtaining the content may include information for connection with the server 330 providing the content and/or information on the address in which the content is stored. The content reproduction information may include, for example, audio volume level information according to reproduction of the content in the display device 310, reproduction-related information including the reproduction position such as information on a frame currently being reproduced or a reproduction time, and, in the case of a web page, the address and the reproduction position or time thereof.

The server 330 may provide a variety of data for supporting an augmented reality service provided through the AR device 320. The server 330 may provide a variety of content output from the AR device 320 or the display device 310.

According to an embodiment, the AR device 320 may connect with the server 330 through the wireless network 360 to receive a variety of data for providing an augmented reality service. The server 330 may be communicatively connected to the AR device 320 using wireless communication. The wireless communication network 350 connecting the server 330 and the AR device 320 may be a long-range wireless communication network (e.g., the second network 199 in FIG. 1). For example, the server 330 and the AR device 320 may be connected using at least one wireless communication scheme among a cellular network, a fifth generation (5G) network, a next-generation communication network, and the Internet, but the wireless communication scheme is not limited thereto.

According to an embodiment, the AR device 320 may obtain corresponding content data, based on information related to the content reproduced in the display device 310.

According to an embodiment, the AR device 320 may receive corresponding content data from the display device 310, based on the content-related information.

According to an embodiment, the AR device 320 may communicate with the server 330, based on the information related to the content reproduced in the display device 310, and receive corresponding content data from the server 330. The AR device 320 may execute an application, based on the content-related information, and output the received content data. The AR device 320 may output the received content data through a virtual object that is produce based on information related to the display device 310. The information related to the display device 310 may include image information that includes form information including the size, color, and shape, position information, and depth information of the display device 310. The AR device 320 may obtain information related to the display device 310 using a sensor or a camera.

The display device 310 and the AR device 320 may be connected through the wireless communication network 340. The wireless communication network 360 connecting the display device 310 and the AR device 320 may be a short-range wireless network (e.g., the first network 198 in FIG. 1). According to various embodiments, the display device 310 and the AR device 320 may be connected using a wireless communication scheme such as WiFi-peer to peer (P2P), Bluetooth, and Bluetooth low energy (BLE), but the wireless communication scheme is not limited to the above-described examples.

According to various embodiments, in order to provide an AR service, the AR device 320 may obtain information about actual surrounding environment including position information, size information, distance information, sensor information, and image information of various real objects including the display device 310 using a sensor or a camera. The AR device 320 may produce a virtual object, based on the information about the surrounding environment, and output the same through a display.

According to an embodiment, the AR device 320 may receive a variety of data including content data from the server 330 or the display device 310 and output the received content data through a virtual object. For example, the AR device 320 may output a virtual object and display content data within the area of the output virtual object.

According to an embodiment, in order to provide an AR service, the AR device 320 may collect a variety of information, based on communication with the display device 310 or the server 330, as well as receiving content data or a variety of information from the display device 310 or the server 330.

Figure 4A:
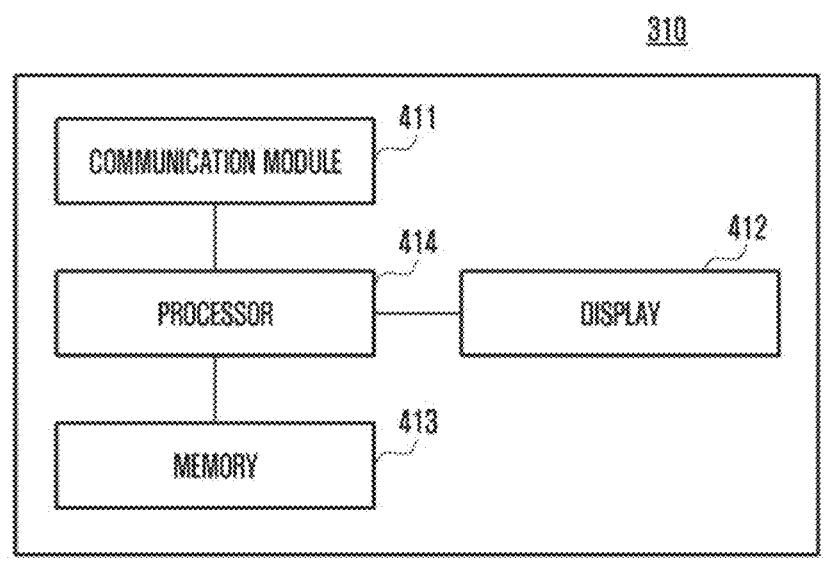
FIG. 4A is a diagram of a display device according to an embodiment.
Figure 4B:
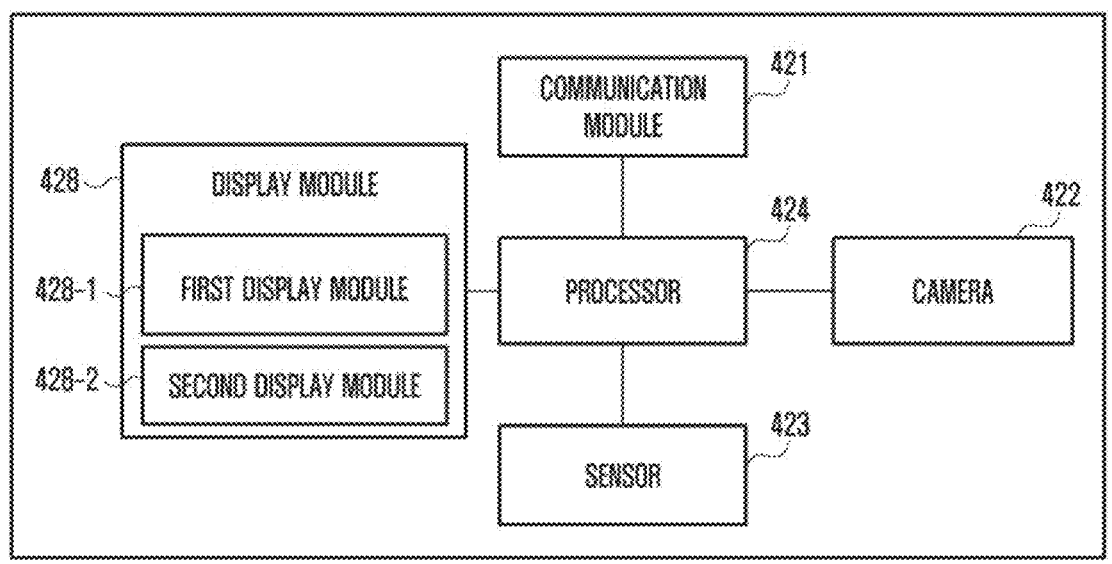
FIG. 4B is a diagram of an AR device according to an embodiment.

FIG. 4A is a diagram of a display device 310 according to an embodiment. FIG. 4B is a diagram of an AR device 320 according to an embodiment.

Referring to FIG. 4A, the display device 310 may include a communication module 411, a display 412, a memory 413, and a processor 414. The display device 310 may further include at least some of the configurations and/or functions of the electronic device 101 in FIG. 1.

According to various embodiments, the communication module 411 may include a software and/or hardware module (e.g., a CP) for wireless communication with a network or an external electronic device (e.g., the AR device 320 in FIG. 4B and/or the server 330 in FIG. 3) and include at least some of the configurations and/or functions of the communication module 190 in FIG. 1. The communication module 411 may communicate with an external electronic device through a wireless communication network (e.g., the first network 198 or the second network 199 in FIG. 1).

According to various embodiments, the communication module 411 may transmit data provided from another element (e.g., the processor 414) of the display device to an external electronic device, or receive data from an external electronic device and transmit the same to another element of the display device. The communication module 411 may communicate with the AR device 320 through a wireless communication network (e.g., the first network 198 in FIG. 1 (e.g., a short-range wireless communication network)) or communicate with the server 330 through a long-range wireless network (e.g., the second network 199 in FIG. 1).

The display 412 may output and provide content including a visual element, based on content data, and include at least some of functions and/or configurations of the display module 160 in FIG. 1. For example, the display 412 may output data provided from another element (e.g., the processor 414) of the display device to the outside of the display device.

According to various embodiments, the memory 413 may store a variety of data used by at least one element (e.g., the processor 414) of a terminal device and include at least some of the configurations and/or functions of the memory 130 in FIG. 1. The memory 413 may store instructions to be executed by the processor 414. For example, the memory 413 may store a variety of information such as address information required for the processor 414 to connect with the server 330 and obtain content data.

The processor 414 may process data in the display device, control at least one other element related to the function of the display device, and perform data processing and operation necessary for executing the function. The processor 414 may include at least some of functions and/or configurations of the processor 120 in FIG. 1. The processor 414 may be electrically and/or functionally connected to the elements of a terminal device, such as the communication module 411, the display 412, and the memory 413.

According to various embodiments, the processor 414 may receive control information from the AR device 320 through the communication module 411 and, based on the same, perform control operations such as volume control, reproduction, pause, or stop of content, and turning on/off the display 412.

According to various embodiments, the processor 414 may provide information related to content currently being reproduced in response to a request of the AR device 320. The processor 414 may receive specific content-related information from the AR device 320, obtain corresponding content data using the received content-related information according to control information of the AR device 320, and output the same through the display 412.

Referring to FIG. 4B, the AR device 320 may include a communication module 421, a camera 422, a sensor 423, a display module 428, and a processor 424.

The AR device 320 may be in the form of glasses capable of being worn on a user, as shown in FIGS. 2A to 2C.

The communication module 421 may include a software and/or hardware module (e.g., a CP) for wireless communication with a network or an external electronic device (e.g., the display device 310 in FIG. 4A or the server 330 in FIG. 3).

According to various embodiments, the communication module 421 may transmit data provided from another element (e.g., the processor 424) of the AR device to an external electronic device, or receive data from an external electronic device and transmit the same to another element of the AR device. The communication module 421 may communicate with the display device 310 through a wireless communication network (e.g., the first network 198 in FIG. 1 (e.g., a short-range wireless communication network)) or communicate with the server 330 through a long-range wireless network (e.g., the second network 199 in FIG. 1).

The camera 422 may photograph still images and moving images. According to an embodiment, the camera may include one or more lenses and image sensors. According to various embodiments, the camera 422 may include at least some of the functions and/or configurations of the camera module in FIG. 2. A recognition camera (gesture camera) for recognizing a certain space, which is able to photograph a real image corresponding to an FoV and/or measure a distance to an object, may be included. According to various embodiments, the camera may photograph a real image corresponding to the FoV of the AR device in order to obtain image information.

The sensor 423 may detect movement of the AR device. According to various embodiments, the sensor may detect a physical quantity related to the movement of the AR device, for example, the velocity, acceleration, angular velocity, angular acceleration, and geographic position of the AR device. The sensor 423 may include various sensors and include a gyro sensor and a gravity sensor, thereby detecting the movement of the AR device, including the position, speed, and/or posture of the AR device. The sensor 423 may include, for example, a tactile sensor to detect wearing of the AR device. The sensor 423 may include an ultrasonic sensor or a light detection and ranging (LiDAR) sensor that emits laser pulses for a LiDAR function.

The display module 428 may visually output information processed by the processor 424 of the AR device. For example, the display module 428 may display various virtual objects, based on virtual information received by the AR device from a server or virtual information produced by the processor 424.

According to various embodiments, the display module 428 may include the glasses in FIG. 2A (e.g., the first glass 220 and the second glass 230) and emit light to the transparent waveguide included in at least a portion of the glasses, and induce the emitted light to the user's eyes, thereby outputting virtual information. The display module 428 may include a first display module 428-1 corresponding to the user's left eye (e.g., the first glass 220 in FIG. 2A) and a second display module 428-2 corresponding to the user's right eye (e.g., the second glass 230 in FIG. 2A). According to an embodiment, the display module 428 may include glasses formed of a transparent (or translucent) element, and a user may recognize the real space behind the display module 428 through the display module 428. The display module 428 may display a virtual object in at least a portion of the transparent element so that the user may see the virtual object added to at least a portion of the real space.

The processor 424 may control at least one other element related to the function of the AR device and perform data processing and operation necessary to execute the function. The processor 424 may be electrically and/or functionally connected to elements of the AR device such as the communication module 421, the camera, the sensor, and the display module 428.

According to various embodiments, the processor 424 may measure physical quantities (e.g., geographic position, velocity, acceleration, angular velocity, and angular acceleration of the AR device) related to the movement of the AR device through the sensor, and obtain movement information of the AR device using the measured physical quantities or a combination thereof.

According to various embodiments, the processor 424 may obtain image information and movement information of the AR device. The processor 424 may obtain image information by photographing an image through the camera. For example, the processor 424 may obtain image information that includes form and size information including the size, color, and shape of the display device 310, and position information and depth information of the display device 310 from the image photographed by the camera.

The processor 424 may obtain information related to the display device 310 such as display brightness (illuminance) information, size information, and position information of the display device 310 through sensors such as an illuminance sensor, a LiDAR sensor, and an ultrasonic sensor.

According to various embodiments, the processor 424 may obtain virtual information, based on the movement information and/or image information of the AR device, and produce a virtual object, based thereon. For example, the processor 424 may extract an image for the display device 310 from an image photographed by the camera and obtain image information including position information and depth information of the display device 310 existing in the image.

According to various embodiments, the processor 424 may produce a virtual object representing the display device 310, based on the image information, and display the same through the display module 428. For example, the processor 424 may produce a virtual object representing the display device 310, based on the image information including size information and illuminance information of the display device 310, and position information and depth information of the display device 310.

According to various embodiments, the processor 424 may analyzes a real image corresponding to the FoV of the AR device, based on movement information of the AR device and/or image information obtained from the camera, and, if the display device 310 has left the FoV, produce a virtual object corresponding to the display device 310, based on information related to the display device 310, thereby displaying the same through the display module 428.

According to various embodiments, the processor 424 of the AR device may receive content data from the display device 310 or the server 330. For example, the processor 424 may receive content data from the display device 310. For example, the processor 424 may receive related content data from the server 330, based on content-related information received from the display device 310. The processor 424 may receive the content data at a specific frame rate from the server 330.

According to various embodiments, if the display device 310 has left the FoV (e.g., the display device 310 being outside of the FOV), the processor 424 of the AR device may display a content image based on the received content data within a virtual object area corresponding to the display device 310, which is produced based on the information related to the display device 310.

An electronic device (e.g., the electronic device 101 in FIG. 1, 2A, 2B, or 2C or the AR device 320 in FIG. 4B) according to various embodiments may include at least one processor (e.g., the processor 120 in FIG. 1 or the processor 424 in FIG. 4B), at least one camera (e.g., the camera module 180 in FIG. 1 or the camera 422 in FIG. 4B), a communication circuit (e.g., the communication module 190 in FIG. 1 or the communication module 421 in FIG. 4B), and at least one display (e.g., the display module 160 in FIG. 1, or the first display module 428-1 and/or the second display module 428-2 in FIG. 4B), where the processor may connect to an external display device (e.g., the display device 310 in FIG. 4A) through the communication circuit, receive information related to content reproduced by the external display device, obtain an image including the external display device that reproduces the content through the camera, obtain information about the external display device, if the external display device is identified to have left (e.g., being outside of) an identifiable range of the at least one camera, produce a virtual object corresponding thereto, based on the information about the external display device, obtain the content, based on the information related to content, and reproduce the obtained content within the area of the virtual object.

According to various embodiments, the processor may provide an image including the external display device that reproduces the content through the display after the external display device has left the identifiable range until the content is reproduced.

According to various embodiments, the processor may stop providing an image including the external display device if the content starts to be reproduced through the virtual object.

According to various embodiments, the information about the external display device may be obtained from the image including the external display device.

According to various embodiments, the information about the external display device may include at least one piece of size, position, or depth information of the external display device, and the virtual object may be produced based on the information about the external display device.

According to various embodiments, the processor may receive the content from the external display device through the communication circuit, based on the information related to content.

According to various embodiments, the information related to content may include information on the external server providing the content or address information of the content, and the processor may connect to the external server, based on the information related to content, and receive the content.

According to various embodiments, the information related to content may include at least one piece of application information for reproducing the content, audio volume level information of the content, and reproduction time information of the content, and the processor may reproduce the content subsequent to the content that was displayed in the external display device within the area of the virtual object using the information related to content.

According to various embodiments, another virtual object for controlling the content reproduced in the area of the virtual object may be displayed near the virtual object produced based on the information about the external display device after the external display device has left the identifiable range of the at least one camera.

According to various embodiments, the processor may perform at least one of an operation of muting the external display device or an operation of switching the external display device to an inactive state if the content starts to be reproduced through the virtual object.

Figure 5:
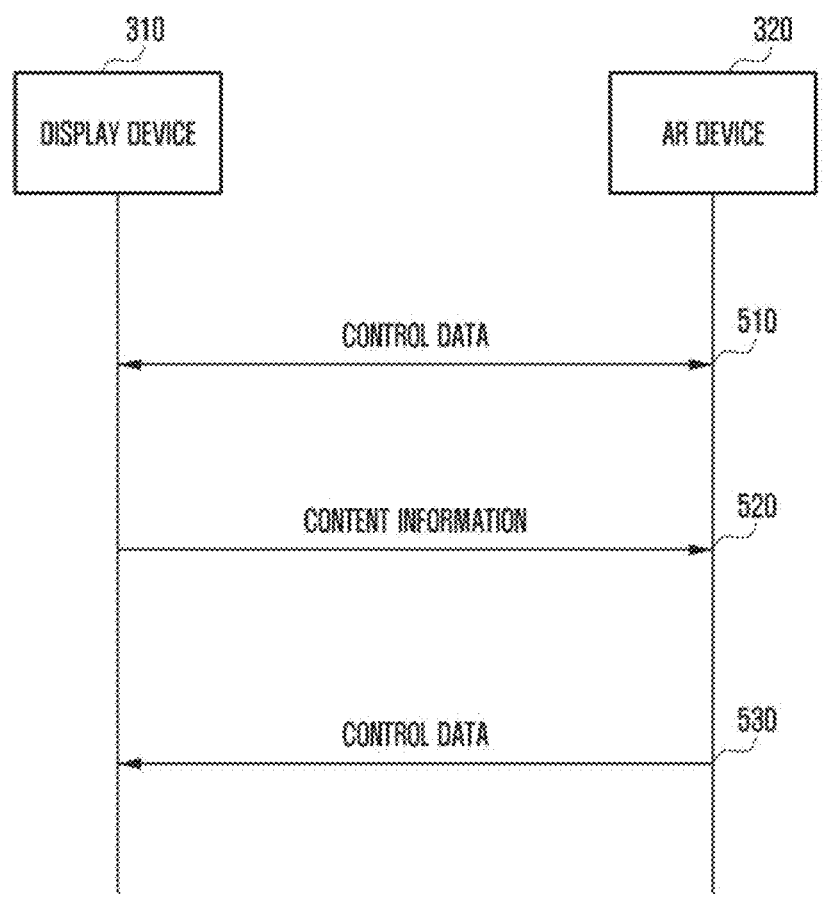
FIG. 5 is a diagram illustrating a communication flow between a display device and an AR device according to an embodiment.

FIG. 5 is a diagram illustrating a communication flow between a display device 310 and an AR device 320 according to an embodiment.

Referring to FIG. 5, when the AR device 320 discovers the display device 310 through image information photographed by a camera (e.g., the camera 422 in FIG. 4B) of the AR device after the AR device 320 is worn on the user and turned on, a processor (e.g., the processor 424 in FIG. 4B) of the AR device 320 may communicate with the display device 310 through a communication module (e.g., the communication module 421 in FIG. 4B).

According to various embodiments, the display device 310 and the AR device 320 may be communicatively connected using short-range wireless communication (e.g., Wi-Fi P2P, Bluetooth, or BLE).

The AR device 320 may transmit/receive a variety of control data to and from the display device 310 in operation 510. The control data exchanged between the AR device 320 and the display device 310 may include, for example, information for controlling a connection between the display device 310 and the AR device 320 and/or information for controlling the operation of the display device 310. The information for controlling the connection between the display device 310 and the AR device 320 may include, for example, information necessary for establishment of connection, such as internet protocol (IP) information and negotiation information of the display device 310 and the AR device 320. The information for controlling the operation of the display device 310 may include control operations such as volume control of the display device 310, reproduction, pause, or stop of content, and power-on/off, and control messages such as a request for transmission of specific information. For example, the AR device 320 may request information related to content reproduced in the display device 310.

The AR device 320 may receive content-related information from the display device 310 in operation 520. The content-related information may include, for example, related application information, information about the name, capacity, and version of the corresponding content, reproduction information thereof, and information for obtaining the content. The information for obtaining the content may include information for connection with the server 330 that provides the content and/or information on an address in which the content is stored. The content reproduction information may include, for example, audio volume level information according to reproduction of the content in the display device 310, reproduction-related information including the reproduction position such as current reproduction time information or frame information, and, in the case of a web page, the address and the reproduction position or time thereof.

If it is identified that the display device 310 has left the FoV, the AR device 320 may transmit control data to the display device 310 in operation 530. The transmitted control data may include, for example, a control command to mute the display device 310, stop reproduction of content being reproduced in the display device 310, enter an inactive state, or turn off the display device 310.

According to various embodiments, the display device 310 may be muted or the audio volume thereof may be adjusted based on at least one piece of information about the degree to which the display device 310 falls outside of the FoV of the AR device 320 or the amount of change in the audio volume of the display device 310 detected by the microphone of the AR device 320. For example, if a change in the audio volume of the display device 310 detected by the microphone of the AR device 320 is not large even in the case where the display device 310 has left the FoV of the AR device 320, the audio volume of the display device 310 may remain as it is. In addition, the AR device 320 may gradually change the volume of the display device 310 and the AR device 320 step by step (e.g., incrementally) with respect to each other, thereby providing the user with an effect of naturally switching the audio volume (e.g., a gradual decrease in the volume of the display device and a gradual increase in the volume of the AR device depending on the degree of falling outside of the FoV or the amount of change in the volume).

Figure 6:
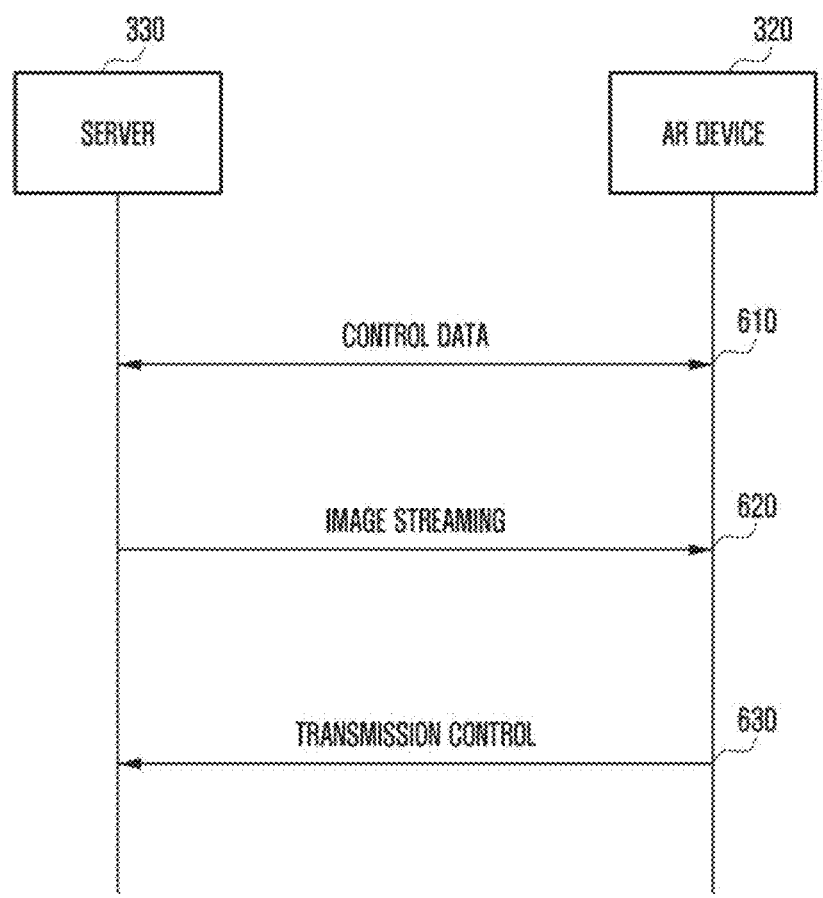
FIG. 6 is a diagram illustrating a communication flow for receiving content data from a server or a display device in an AR device according to an embodiment.

FIG. 6 is a diagram illustrating a communication flow for receiving content data from a server (e.g., the server 330 in FIG. 3) or a display device (e.g., the display device 310 in FIG. 3) in an AR device (e.g., the AR device 320 in FIG. 3) according to an embodiment.

The operation of the AR device 320 may be performed under the control of a processor (e.g., the processor 424 in FIG. 4B) of the AR device 320. Hereinafter, although an example in which the AR device 320 receives content data from the server 330 will be described, the disclosure is not limited thereto, and the content data may also be received from the display device 310.

According to an embodiment, the AR device 320 may establish a connection with the server 330 through a wireless communication network in operation 610, based on the content-related information received from the display device 310 in operation 520 in FIG. 5, may transmit/receive control data for requesting content data to/from the server 330. The content-related information may include, for example, related application information, information on the name, capacity, and version of corresponding content, reproduction information, and information for obtaining corresponding content. The information for obtaining the content may include information for connection with the server 330 providing the content and/or information on the address in which the content is stored. The content reproduction information may include, for example, audio volume level information according to reproduction of the content in the display device 310, reproduction-related information including the reproduction position such as current reproduction time or frame information, and, in the case of a web page, the address and the reproduction position or time thereof.

The wireless communication network connecting the AR device 320 and the server 330 may be a long-range wireless communication network (e.g., the second network 199 in FIG. 1). For example, the server 330 and the AR device 320 may be connected using at least one wireless communication scheme among a cellular network, a 5G network, a next-generation communication network, and the Internet, but the wireless communication scheme is not limited thereto. The AR device 320 may transmit content-related information to the server 330 after the connection with the server 330 is established.

The AR device 320 may receive content data from the server 330, based on the content-related information, in operation 620. For example, the server 330 may stream content data images to the AR device 320 at a specified frame rate. For example, the AR device 320 may transmit transmission control information for controlling video streaming of the content data to the server 330 in operation 630. The transmission control information may include information about a transmission frame rate of content video streaming and information for controlling content data transmission such as stopping or ending transmission.

Requested content may be specified based on the information, and data corresponding to the entirety of the specified content data or frames subsequent to the specified frame may be streamed to the AR device 320. The specified frame may be a frame before or after a frame recently output from the display device 310 according to the content reproduction information.

Figure 7:
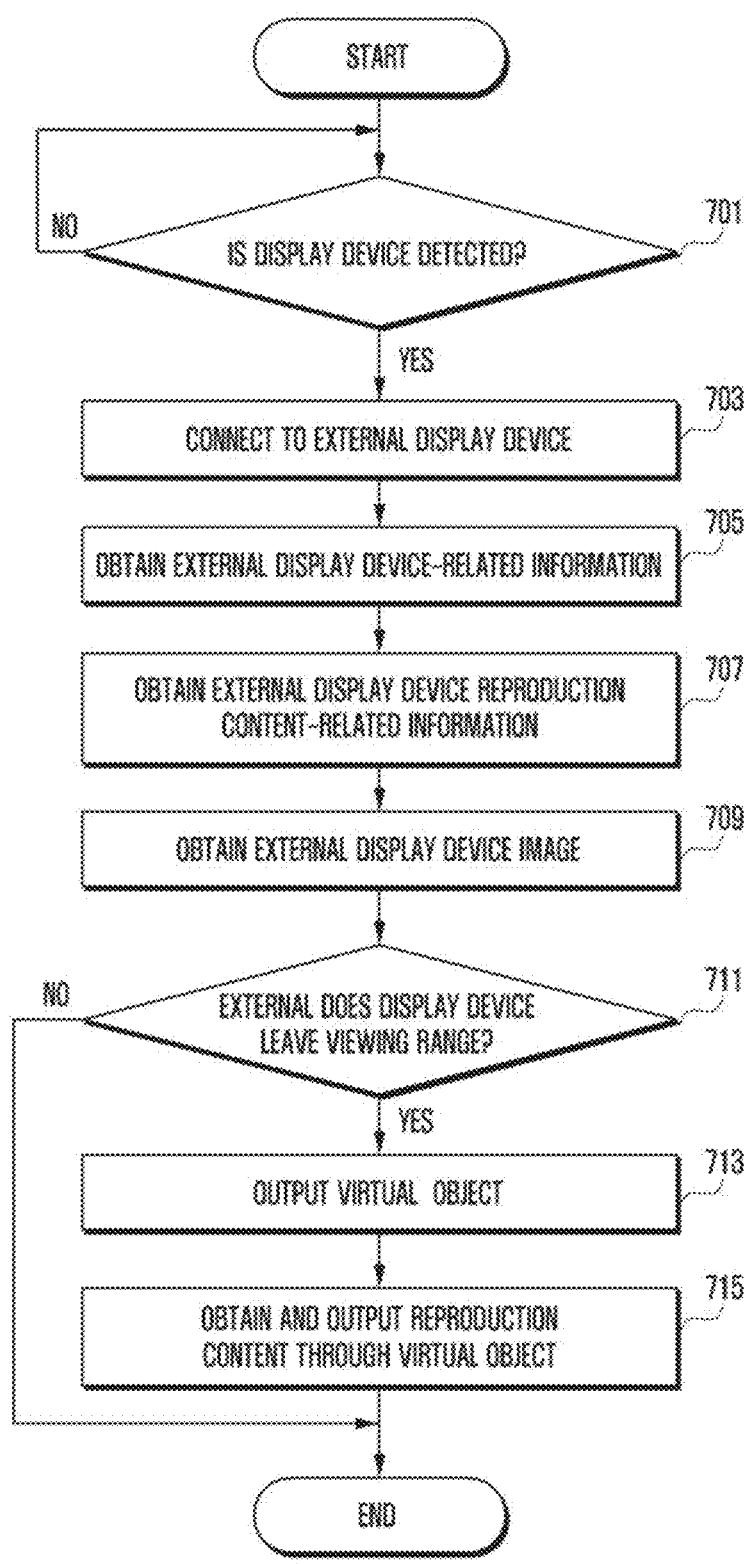
FIG. 7 is a flowchart illustrating the operation of an AR device according to an embodiment.
Figure 8:
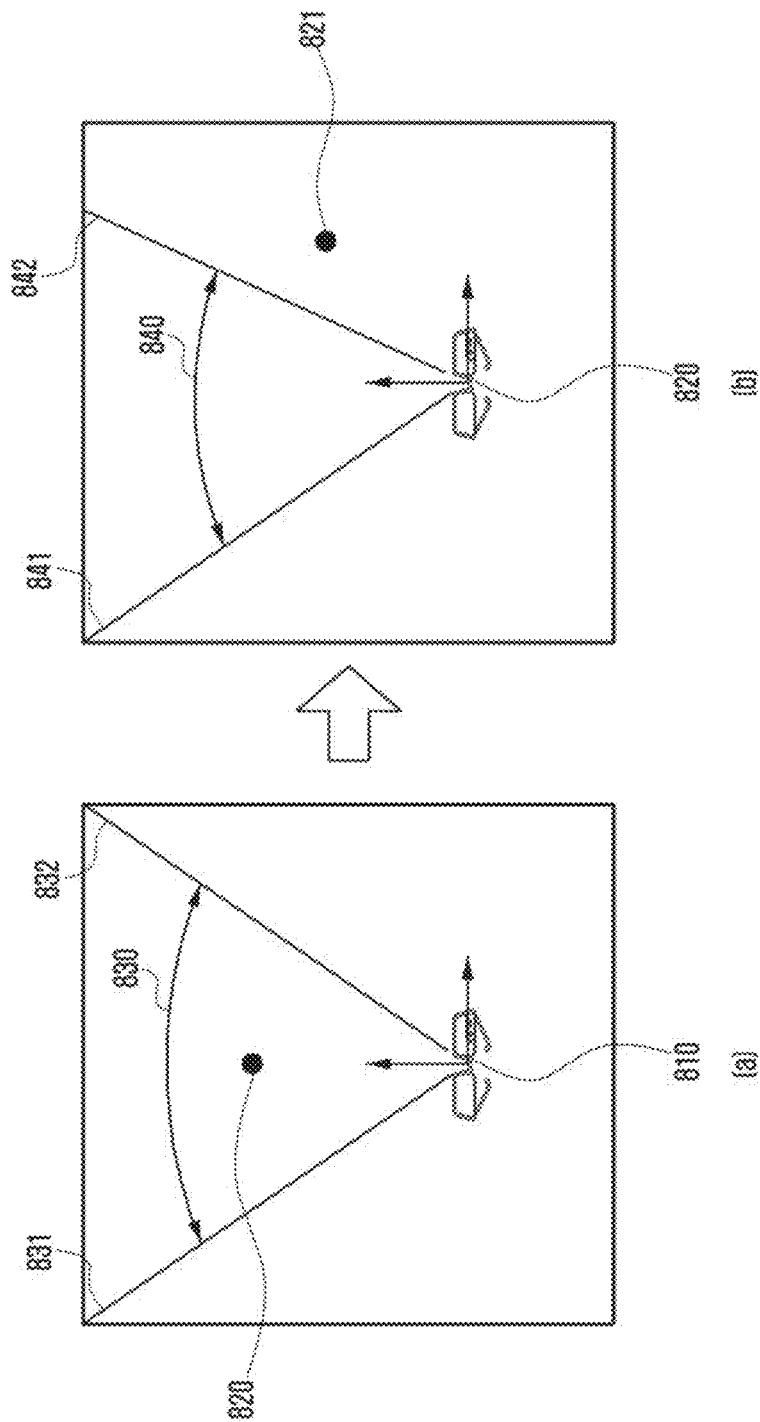
FIG. 8 is a diagram illustrating a viewing range of an AR device according to an embodiment.
Figure 9A:
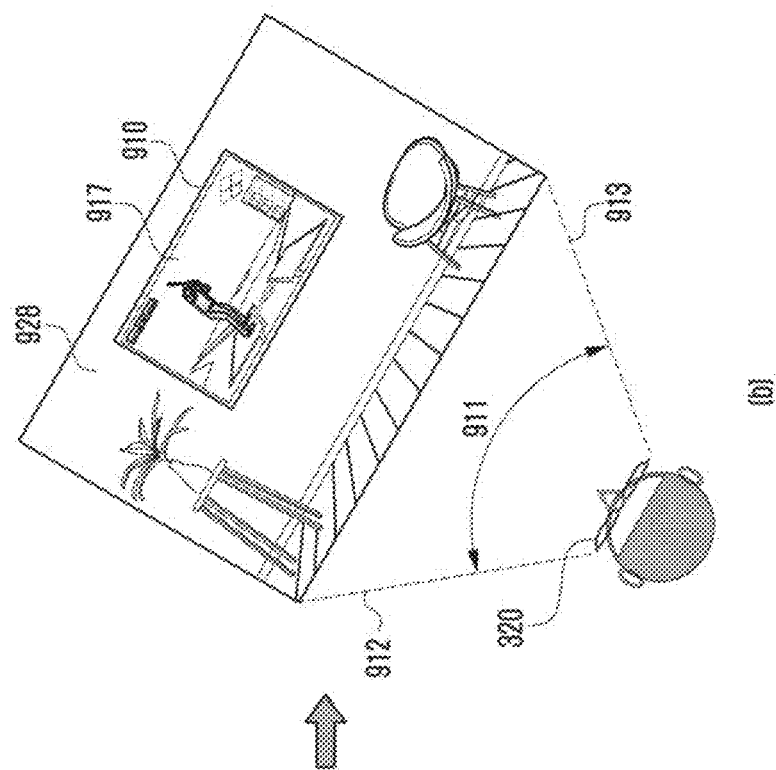
Figure 9A:
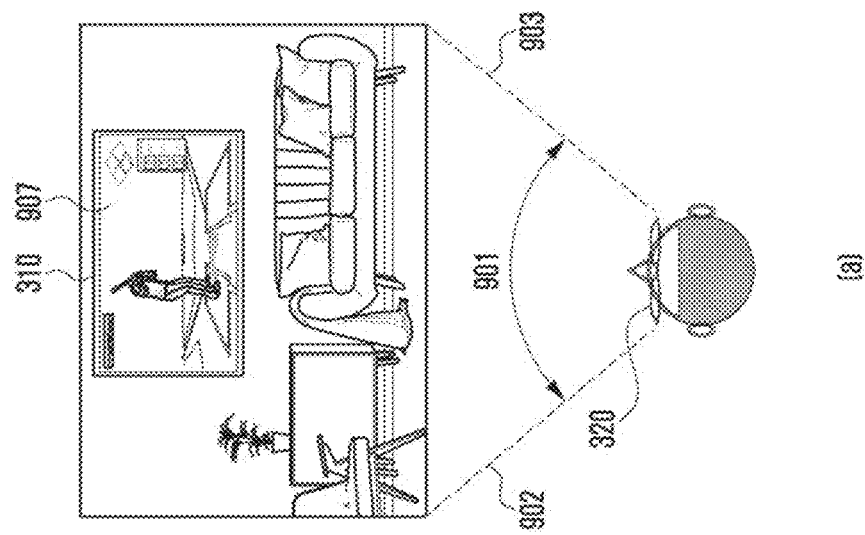

FIG. 7 is a flowchart illustrating the operation of an AR device (e.g., the AR device 320 in FIG. 3) according to an embodiment. FIG. 8 is a diagram illustrating a viewing range of an AR device 320 according to an embodiment. FIGS. 9A and 9B are diagrams illustrating the operation of an AR device 320 according to an embodiment. Hereinafter, the operation of the AR device 320 will be described with reference to FIGS. 7 to 9B. The operation of the AR device 320 to be described below may be performed under the control of a processor (e.g., the processor 424 in FIG. 4B).

If the user wears the AR device 320 after it is turned on, the AR device 320 may detect that it is worn through a sensor (e.g., the sensor 423 in FIG. 4B), and then start an operation of providing an AR service.

The AR device 320 may detect an external display device (e.g., the display device 310 in FIG. 3) in operation 701. The AR device 320 may photograph an image including real objects within an FoV through a camera (e.g., the camera 422 in FIG. 4B), and the processor may identify whether or not the external display device 310 is present in the image, thereby detecting the external display device 310. For example, the user may wear the AR device 320 and view content displayed in the external display device 310, thereby detecting the display device 310. The AR device 320 may detect the external display device 310 using a sensor such as an ultrasonic sensor or a LiDAR sensor.

The AR device 320 may connect to the external display device 310 in operation 703. The AR device 320 may be connected to the external display device 310 through a wireless communication network. The wireless communication network connecting the AR device 320 and the external display device 310 may be a short-range wireless network (e.g., the first network 198 in FIG. 1). The AR device 320 and the external display device 310 may be connected using a wireless communication scheme such as WiFi-P2P, Bluetooth, and BLE (Bluetooth low energy), but the wireless communication scheme is not limited to the above-described examples.

The AR device 320 may obtain information related to the external display device 310 in operation 705. The information related to the external display device 310 may include image information that includes an image including the size, color, and shape of the external display device 310, position information, and depth information. The AR device 320 may obtain information related to the external display device 310 using a sensor or a camera. For example, the AR device 320 may identify the external display device 310 from an image obtained through a camera and obtain size and position information and depth information of the external display device 310 from the image. For example, the AR device 320 may identify the position and size of the external display device 310 and calculate the distance thereof using a sensor such as an ultrasonic sensor or a LiDAR sensor.

The AR device 320 may obtain reproduced content-related information from the external display device 310 in operation 707. The content-related information may include, for example, related application information, information about the name, capacity, and version of the corresponding content, reproduction information thereof, and information for obtaining the content. The information for obtaining the content may include information for connection with the server 330 that provides the content and/or information on an address in which the content is stored. The content reproduction information may include, for example, audio volume level information according to reproduction of the content in the external display device 310, reproduction-related information including the reproduction position such as current reproduction frame information, and, in the case of a web page, the address and the reproduction position or time thereof.

The AR device 320 may obtain an image including the external display device 310 reproducing the content in operation 709. For example, the AR device 320 may photograph an image including the entirety of the current viewing range of the AR device 320 through the camera.

The AR device 320 may identify whether or not the external display device 310 has left the viewing range in operation 711. That is, the AR device 320 may identify whether or not the external display device 310 is outside of a range of the camera and/or the AR device 320. Here, the viewing range may indicate a specified range detected by the sensor of the AR device 320. For example, the AR device 320 may obtain movement information of the AR device 320 using a sensor, if the movement of the AR device 320 is detected, photograph an image within the viewing range of the AR device 310 using the camera, and if the external display device 310 is not identified in the image, determine that the external display device 310 has left the viewing range. For example, the AR device 320 may photograph a two-dimensional image and compare position information of the two-dimensional image with an FoV of the AR device 320, thereby identifying whether or not the two-dimensional image falls outside of the viewing range of the AR device 320. In addition, the AR device 320 may be configured to compare position information of the display device 320 with position information of the two-dimensional image and, based on whether or not the two-dimensional image is covered by the display device 320, identify whether or not the two-dimensional image falls outside of the viewing range of the AR device 320.

Referring to FIG. 8, the viewing range of the AR device 320 may be a range that the user wearing the AR device 320 is able to recognize through the AR device. For example, the viewing range may be an FoV of the AR device. The AR device may identify the FoV of the AR device, based on information on a photographed image and/or movement information of the AR device.

According to various embodiments, the AR device 320 may model a virtual space, based on the information on the photographed image, and identify, as an FoV, a range 830 between the recognizable leftmost gaze boundary 831 and the recognizable rightmost gaze boundary 832 of a virtual camera 810 at a corresponding position and posture in the virtual space modeled using movement information of the AR device in the virtual space. In this case, the terminal device may compare the position of an object 820 with the FoV 830 to determine whether or not the object falls outside of the viewing range of the AR device. In addition, if the position or posture of the virtual camera 810 in the virtual space changes to the position or posture of the virtual camera 820, a range 840 between the recognizable leftmost gaze boundary 841 and the recognizable rightmost gaze boundary 842 at a corresponding position and posture may be identified as an FoV. In this case, the terminal device may compare the positions of objects 820 and 821 with the fields of view 830 and 840 to determine whether or not the objects fall outside of the viewing range of the AR device. For example, the AR device, if the object 820 is included in the FoV 830 that the camera 810 in the virtual space may have, may determine that the object does not fall outside of the viewing range, or, if the object 821 is not included in the FoV 840 that the camera 820 in the virtual space may have, determine that the object falls outside of the viewing range. If the AR device 320 identifies that the external display device 310 has not left the viewing range, the process may end.

Referring back to FIG. 7, if the external display device 310 has left the viewing range, the AR device 320 may produce a virtual object, based on information related to the external display device 310, in operation 713 and output the same through a display (e.g., the display module 428 in FIG. 4B). For example, the AR device 320 may produce a virtual object representing the external display device 310, based on image information including the size, position information, depth information, and illuminance information of the external display device 310.

For example, the AR device 320 may display a virtual object replacing the external display device 310 according to the size and depth information of the external display device 310 to have the same size and depth within the viewing range after movement, thereby reducing dizziness due to the difference in depth information.

The AR device 320 may display the virtual object at the same position within the viewing range after movement according to the position information in the previous viewing range of the external display device 310. However, if another object (e.g., a moving person or a configured object of interest) is recognized at the corresponding position, the virtual object may be moved to another position and then displayed.

The AR device 320 may obtain content, based on content-related information, in operation 715 and reproduce the content through the output virtual object of the display, based on content reproduction information. The AR device 320 may receive content from a server (e.g., the server 330 in FIG. 3) or the external display device 310, based on the content-related information. For example, a virtual object produced based on image information of the external display device 310 may correspond to information such as the size, position, depth, and color of the external display device 310, and the obtained content may be output through a content reproduction area of the virtual object in the shape of the external display device 310.

The AR device 320 may reproduce the content subsequent to the content that was reproduced in the external display device 310 through the virtual object, based on reproduction information among the content-related information. In addition, based on the reproduction information, the audio volume of the reproduced content may be configured to be the same as the audio volume reproduced in the external display device 310.

After the external display device 310 has left the viewing range, the AR device 320 may output an image including the external display device 310 that reproduces the content through the display at least until the virtual object is produced and output. If the content starts to be reproduced, the AR device 320 may stop outputting an image including the external display device 310 photographed by the camera.

Referring to FIGS. 9A, 9B, and 9C, in (a) of FIGS. 9A, 9B, and 9C, the AR device 320 in the state of being worn on the user may restrict displaying of other virtual objects in the area of the external display device 310 such that the light emitted from the area of the external display device 310 is able to pass through the glasses of the AR device 320, so that the user may watch the content (e.g., an image) 907 displayed in the external display device 310.

The AR device 320 may recognize the external display device 310 together with a plurality of real objects within a viewing range 901 between a recognizable leftmost gaze boundary 902 and the recognizable rightmost gaze boundary 903.

Thereafter, a viewing range 911 may change due to movement of the AR device 320 as shown in (b) of FIGS. 9A, 9b, and 9C so that the external display device 310 may leave the range between a leftmost gaze boundary 912 and a rightmost gaze boundary 913. That is, the AR device 320 may fail to identify the external display device 310 in the two-dimensional image 928 photographed by the camera within the viewing range 911.

As shown in (b) of FIGS. 9A, 9B and 9C, the AR device 320 may produce and display a virtual object 910, based on information related to the external display device 310, and may display content 917 subsequent to the content 907 that was previously reproduced in the external display device 310 within the area of the displayed virtual object 910, based on the content related information.

The AR device 320 may display the virtual object 910, based on related information of the external display device 310. For example, the AR device 320 may display a virtual object replacing the external display device 310 according to the size and depth information of the external display device 310 to have the same size and depth, thereby reducing dizziness due to the difference in depth information.

The AR device 320, according to the position information of the external display device 310 in the previous viewing range 901, may display the virtual object at the same position of the two-dimensional image 928 photographed by the camera within the viewing range after movement, for example, within the viewing range 911. However, if another object (e.g., a moving person or a configured object of interest) is recognized at the corresponding position, the virtual object may be moved to another position and then displayed.

The AR device 320 may apply reproduction information of the content 907 in the external display device 310 to the content 917 reproduced in the area of the virtual object 910. For example, the content 917 reproduced in the area of the virtual object 910 may be the same content as the content 907 reproduced in the external display device 310, and may be continuously reproduced subsequent to the last content reproduced in the external display device 310. In addition, the audio volume level of the content 917 may be adjusted to be the same as the audio volume level reproduced in the external display device 310.

Referring to FIG. 9B, the AR device 320 may display, as a virtual object, a control panel 909 for controlling the audio volume of the external display device 310 on the right side of the external display device 310 in (a). In (b) after switching the viewing range due to the movement, the AR device 320 may display a virtual object 910 that replaces the external display device 310 and reproduce the content 917, and at the same time, may display, as a virtual object, a control panel 919 for controlling the audio volume of the content 917 on the right side of the virtual object 910. The display of the virtual object 919 for audio volume control is an example, and the AR device 320 may display, in addition to the audio volume, a variety of additional information related to the reproduced content or the external display device 310 as a virtual object. For example, a variety of additional information displayed as a virtual object may include text related to content, subtitles in the case where content has an audio caption (subtitles), and text converted from audio data included in content.

Referring to the example in FIG. 9C, in the case where the external display device 310 provides an audio caption (subtitles) 915 for content displayed in the external display device 310 in (a), the virtual object 910 replacing the external display device 310 may be displayed and the content 917 is reproduced in (b), and at the same time, additional information related to the content 917, for example, an audio caption (subtitles) 925 may be display, as an individual virtual object, below the virtual object 910. For example, even if the external display device 310 does not provide audio captions (subtitles), the voice of the content may be converted into text (e.g., speech to text), thereby providing a virtual object 925 including the converted text.

The AR device 320 may display an image that is photographed at the time at which the content 907 was previously reproduced in the external display device 310 until the content 917 is reproduced in the area of the virtual object 910 after the external display device 310 has left the viewing range. The AR device 320 may stop outputting the image if the content 917 starts to be reproduced in the area of the virtual object 910. Therefore, even if the external display device 310 disappears from the viewing range, the user may recognize that the content 907 reproduced in the external display device 310 naturally switches to the virtual object until the content 917 is reproduced through the virtual object 910, which enables seamless switching without overlapping between the real object and the virtual object.

If the content 917 starts to be reproduced in the area of the virtual object 910 after the external display device 310 has left the viewing range, the AR device 320 may mute the external display device 310. If the content 917 starts to be reproduced in the area of the virtual object 910, the AR device 320 may stop or terminate reproduction of the content 907 in the external display device 310. If the content 917 starts to be reproduced in the area of the virtual object 910, the AR device 320 may switch the operation state of the external display device 310 to an inactive state (e.g., sleep) or turn off the power.

Figure 10:
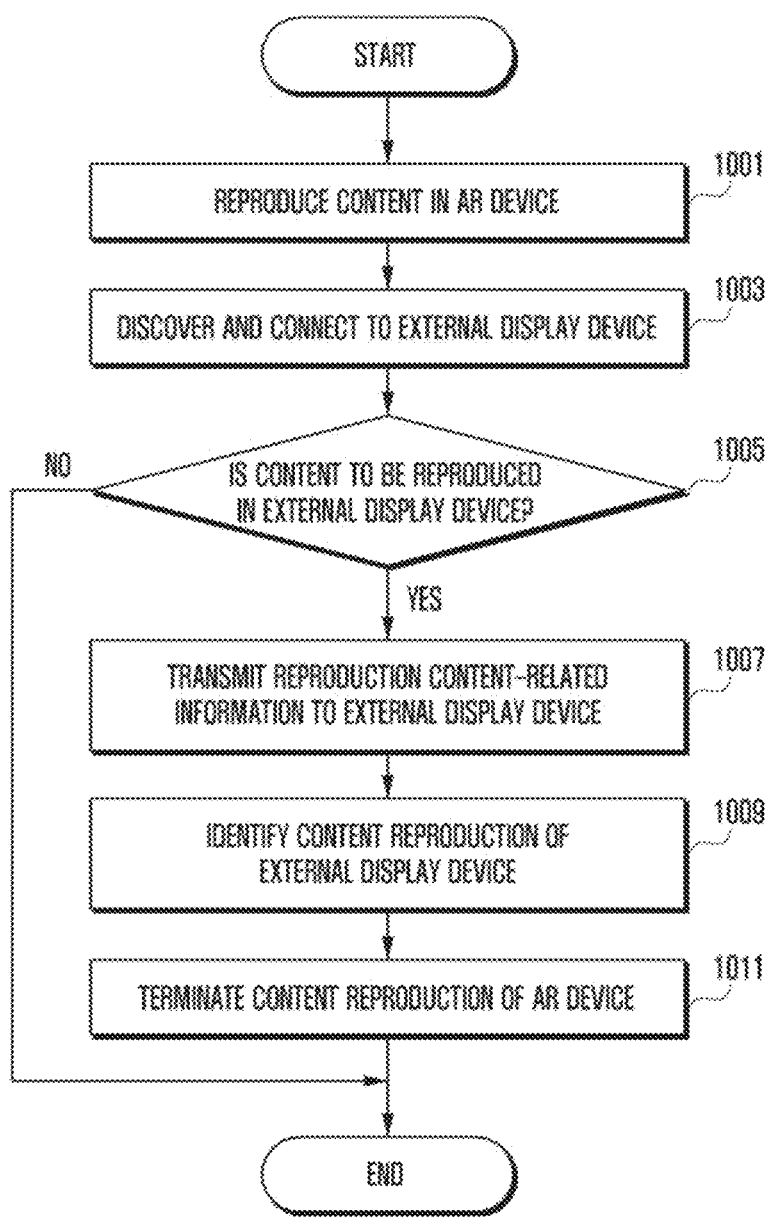
FIG. 10 is a flowchart illustrating the operation of an AR device according to an embodiment.

FIG. 10 is a flowchart illustrating the operation of an AR device according to an embodiment.

According to an embodiment, the AR device 320 may provide content through a display (e.g., the display module 428 in FIG. 4B), as an AR service, in operation 1001. For example, the AR device 320 may reproduce an image.

The AR device 320 may discover an external display device (e.g., the display device 310 in FIG. 3) and connect with the same in operation 1003. The AR device 320 may photograph an image including real objects within an FoV through a camera (e.g., the camera 422 in FIG. 4B), and the processor may identify whether or not the external display device 310 is present in the image, thereby detecting the external display device 310. For example, while the user wears the AR device 320 and views an image reproduced through the display, the external display device 310 entering the viewing range due to movement of the AR device 320 may be detected.

The AR device 320 may establish a communication connection with the discovered display device 310. The AR device 320 may be connected to the external display device 310 through a wireless communication network. The wireless communication network connecting the AR device 320 and the external display device 310 may be a short-range wireless network (e.g., the first network 198 in FIG. 1). The AR device 320 and the external display device 310 may be connected using a wireless communication scheme such as WiFi-P2P, Bluetooth, and BLE, but the wireless communication scheme is not limited to the above-described examples.

In operation 1005, the AR device 320 may identify whether or not to reproduce the content, which was previously reproduced in the AR device 320, in the external display device 310. To this end, the AR device 320 may display, for example, a pop-up window asking whether or not to reproduce the content in the external display device 310. The AR device 320 may receive an input for reproducing the content in the external display device 310 according to a user's selection. When the AR device 320 identifies that the content is not to be reproduced in the external display device, the process may end.

In the case where the content is to be reproduced in the external display device 310, the AR device 320 may transmit reproduced content-related information to the external display device 310 in operation 1007. The content-related information may include, for example, related application information, name, capacity, and version information of corresponding content, content reproduction information, and information for obtaining corresponding content. The information for obtaining the content may include information for connection with the server 330 providing the content and/or information on the address in which the content is stored. The content reproduction information may include, for example, audio volume level information according to reproduction of the content in the external display device 310, reproduction-related information including the reproduction position such as information on a frame currently being reproduced, and, in the case of a web page, the address and the reproduction position or time thereof.

The AR device 320 may identify that the content is reproduced in the external display device 310 in operation 1009. The AR device 320 may identify whether or not the content starts to be reproduced by photographing an image including the external display device 310 through the camera or communicating with the external display device 310.

As the external display device 310 starts to reproduce the content, the AR device 320 may terminate reproduction of the content through the display in operation 1011. Accordingly, the user may watch the content, which is reproduced in the external display device 310, through the AR device 320.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. An electronic device comprising:
 at least one camera;
 a display;
 a communication circuit; and
 at least one processor configured to:
  receive, via the communication circuit, information related to content output by an external display device,
  based on the external display device being identified to be inside of an identifiable range of the at least one camera, obtain, by the at least one camera, a first image comprising the external display device,
  after the external display device is identified to be outside of the identifiable range of the at least one camera, generate a virtual object on the display and provide a part of the first image in the virtual object on the display,
  receive the content output by the external display device, based on the information related to the content output by the external display device, and
  after receiving the content, stop providing the part of the first image and output the received content in the virtual object.

2. The electronic device of claim 1, wherein the at least one processor is further configured to obtain information about the external display device from the first image, and
 wherein the virtual object corresponding to the external display device is generated based on the information about the external display device.

3. The electronic device of claim 2, wherein the information about the external display device comprises at least one of size information, position information, and depth information of the external display device, and
 wherein the virtual object is output based on the information about the external display device.

4. The electronic device of claim 1, wherein the at least one processor is further configured to receive the content from the external display device, based on the information related to the content.

5. The electronic device of claim 1, wherein the information related to the content comprises information on an external server providing the content or address information of the content, and
 wherein the at least one processor is further configured to:
  connect to the external server based on the information related to the content, and
  receive the content.

6. The electronic device of claim 1, wherein the information related to the content comprises at least one of application information for reproducing the content, audio volume level information of the content, and reproduction time information of the content, and
 wherein the at least one processor is further configured to output the content within an area of the virtual object based on the information related to the content.

7. The electronic device of claim 1, wherein the at least one processor is further configured to display another virtual object for controlling the content output in an area of the virtual object based on the information about the external display device and after the external display device is identified to be outside of the identifiable range of the at least one camera.

8. The electronic device of claim 1, wherein the at least one processor is further configured to, based on the content starting to be output through the virtual object, perform at least one of muting the external display device and switching the external display device to an inactive state.

9. A method of an electronic device, the method comprising:

receiving information related to content output by an external display device;

based on the external display device being identified to be inside of an identifiable range of at least one camera of the electronic device, obtaining a first image comprising the external display device;

after the external display device being identified to be outside of the identifiable range of at least one camera of the electronic device, generating a virtual object on the display and providing a part of the first image in the virtual object on the display;

receiving the content output by the external display device based on the information related to the content output by the external display device; and after receiving the content, stopping providing the part of the first image and outputting the received content in the virtual object.

10. The method of claim 9, further comprising obtaining information about the external display device from the first image, wherein the virtual object corresponding to the external display device is generated based on the information about the external display device.

11. The method of claim 10, wherein the information about the external display device comprises at least one of size information, position information, or depth information of the external display device, and wherein the virtual object is output based on the information about the external display device.

12. The method of claim 11, further comprising receiving the content from the external display device based on the information related to the content.

13. The method of claim 11, wherein the information related to the content comprises information on an external server providing the content or address information of the content, and wherein the method further comprises:
connecting to the external server based on the information related to the content, and
receiving the content.

14. The method of claim 9, wherein the information related to the content comprises at least one of application information for reproducing the content, audio volume level information of the content, and reproduction time information of the content, and wherein the content is output within an area of the virtual object based on the information related to the content.

15. The method of claim 9, further comprising displaying another virtual object for controlling the content output in an area of the virtual object based on the information about the external display device and after the external display device is identified to be outside of the identifiable range of the at least one camera of the electronic device.

16. The method of claim 9, further comprising performing at least one of an operation of muting the external display device and an operation of switching the external display device to an inactive state based the content starting to be output through the virtual object.

* * * * *